United States Patent
Hosoya et al.

(10) Patent No.: US 6,371,167 B1
(45) Date of Patent: Apr. 16, 2002

(54) DRAIN PIPE FOR DRAINING WATER OR THE LIKE FROM CASING

(75) Inventors: Akifumi Hosoya, Anjo; Yasuyuki Wakahara, Kariya, both of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/940,648

(22) Filed: Aug. 29, 2001

(30) Foreign Application Priority Data

Aug. 30, 2000 (JP) ........................................ 2000-260702

(51) Int. Cl.[7] .............................. F15D 1/02; H02K 5/10
(52) U.S. Cl. ............................ 138/177; 138/37; 310/88
(58) Field of Search ........................ 138/37, 39, 177; 310/88, 89

(56) References Cited

U.S. PATENT DOCUMENTS

| | | | | |
|---|---|---|---|---|
| 3,894,302 A | * | 7/1975 | Lasater ......................... | 138/37 |
| 4,155,376 A | * | 5/1979 | Stahli .......................... | 138/37 |
| 5,010,265 A | * | 4/1991 | Tanaka et al. ................. | 310/88 |
| 5,505,027 A | * | 4/1996 | Young .......................... | 138/37 |
| 6,056,014 A | * | 5/2000 | Kojima et al. ................ | 138/39 |

FOREIGN PATENT DOCUMENTS

JP           3-127465           12/1991

OTHER PUBLICATIONS

Journal of Nippondenso Technical Disclosure NO. 70–101, Feb. 15, 1990.

* cited by examiner

Primary Examiner—Patrick Brinson
(74) Attorney, Agent, or Firm—Oliff & Berridge, PLC (57) ABSTRACT

A drain pipe connected to a casing includes a water inlet opening and a couple of water outlet openings. The inlet opening is arranged at an upper end part of the drain pipe and is communicated to an internal space of the casing. The outlet openings are arranged at a lower end part of the drain pipe and extend laterally of the drain pipe in opposite directions, respectively. The drain pipe further includes a cylindrical outer wall that defines an interior space therein. The interior space communicates the water inlet opening with the water outlet openings. A partition wall is provided within the interior space of the cylindrical outer wall to divide at least a portion of the interior space of the cylindrical outer wall into two compartments. Each one of the water outlet openings is provided to each corresponding one of the compartments.

7 Claims, 7 Drawing Sheets

DRAIN PIPE FOR DRAINING WATER OR THE LIKE FROM CASING

CROSS REFERENCE TO RELATED APPLICATION

This application is based on and incorporates herein by reference Japanese Patent Application No. 2000-260702 filed on Aug. 30, 2000.

BACKGROUND OF THE INVENTION

1. Field of the Invention

The present invention relates to a drain pipe for draining water or the like accumulated in a casing of, for example, a starting motor (starter) of a vehicle engine.

2. Description of Related Art

Water will be applied to a drain pipe connected, for example, to a bottom side of a casing of a starting motor of a vehicle engine when water is thrown off to the drain pipe by a tire of the vehicle that passes through a puddle of rain water (hereinafter referred to as a first case) or when water of relatively high pressure is applied to the drain pipe during car washing (hereinafter referred to as a second case).

In the first case, the water is generally applied to a lateral side of the drain pipe since the vehicle generally runs in one direction when it passes through the puddle of rain water. On the other hand, in the second case, the water can be mainly applied to an upper side and a lower side of the drain pipe. However, the water applied toward the upper side of the drain pipe is substantially shielded by the casing and thereby loses its pressure. Thus, in the second case, it is only required to deal with the water applied to the lower side of the drain pipe. As a result, in order to restrain intrusion of the water into an internal space of the casing upon application of the water to the drain pipe, it is only required to restrain the water applied to the lateral side of the drain pipe and the water applied to the lower side of the drain pipe.

In Japanese Unexamined Utility Model Publication No. 3-127465, a drain pipe having a couple of water outlet openings is disclosed. The outlet openings are provided at a lower end part of the drain pipe and extend laterally away from each other. In this drain pipe, when water is applied to a lower side of the drain pipe, intrusion of the water into the water outlet openings can be advantageously restrained due to the fact that the outlet openings extend laterally. Furthermore, in this drain pipe, the interior space forms a labyrinth that communicates a water inlet opening located at its upper end portion with the water outlet openings located at its lower end portion. Thus, even if the water of relatively high pressure is laterally applied to the drain pipe, intrusion of the water from the water outlet openings of the drain pipe through the interior space of the drain pipe can be advantageously restrained.

However, in the drain pipe disclosed in the Japanese Unexamined Utility Model Publication No. 3-127465, only one interior space or compartment is provided to communicate the water inlet opening with the water outlet openings. Thus, when the water is laterally applied to the water outlet openings of the drain pipe, the water outlet openings can be covered with the water. In such a case, the water cannot be effectively drained through the drain pipe. Furthermore, when the water is applied to the starting motor, the starting motor is rapidly cooled, causing development of a negative pressure in the internal spade of the starting motor. In this state, if the outlet openings of the drain pipe are covered with the water, the water is disadvantageously sucked into the internal space of the casing by the negative pressure.

SUMMARY OF THE INVENTION

Thus, it is an objective of the present invention to provide a drain pipe that can restrain intrusion of water through the drain pipe when the water is applied to a lower side of the drain pipe and also when the water is applied to a lateral side of the drain pipe.

To achieve the objective of the present invention, there is provided a drain pipe connected to a drain hole of a casing. The drain pipe includes a water inlet opening, a plurality of water outlet openings, a cylindrical outer wall and a partition wall. The water inlet opening is arranged at an upper end part of the drain pipe and is communicated to an internal space of the casing. The water outlet openings are arranged at a lower end part of the drain pipe and extend laterally of the drain pipe in different directions. The cylindrical outer wall is arranged at an intermediate part of the drain pipe. The cylindrical outer wall defines an interior space therein. The interior space communicates the water inlet opening with the water outlet openings. The partition wall is provided within the interior space of the cylindrical outer wall to divide at least a portion of the interior space of the cylindrical outer wall into a plurality of compartments. Each one of the plurality of water outlet openings is provided to each corresponding one of the plurality of compartments.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

Figure 1:
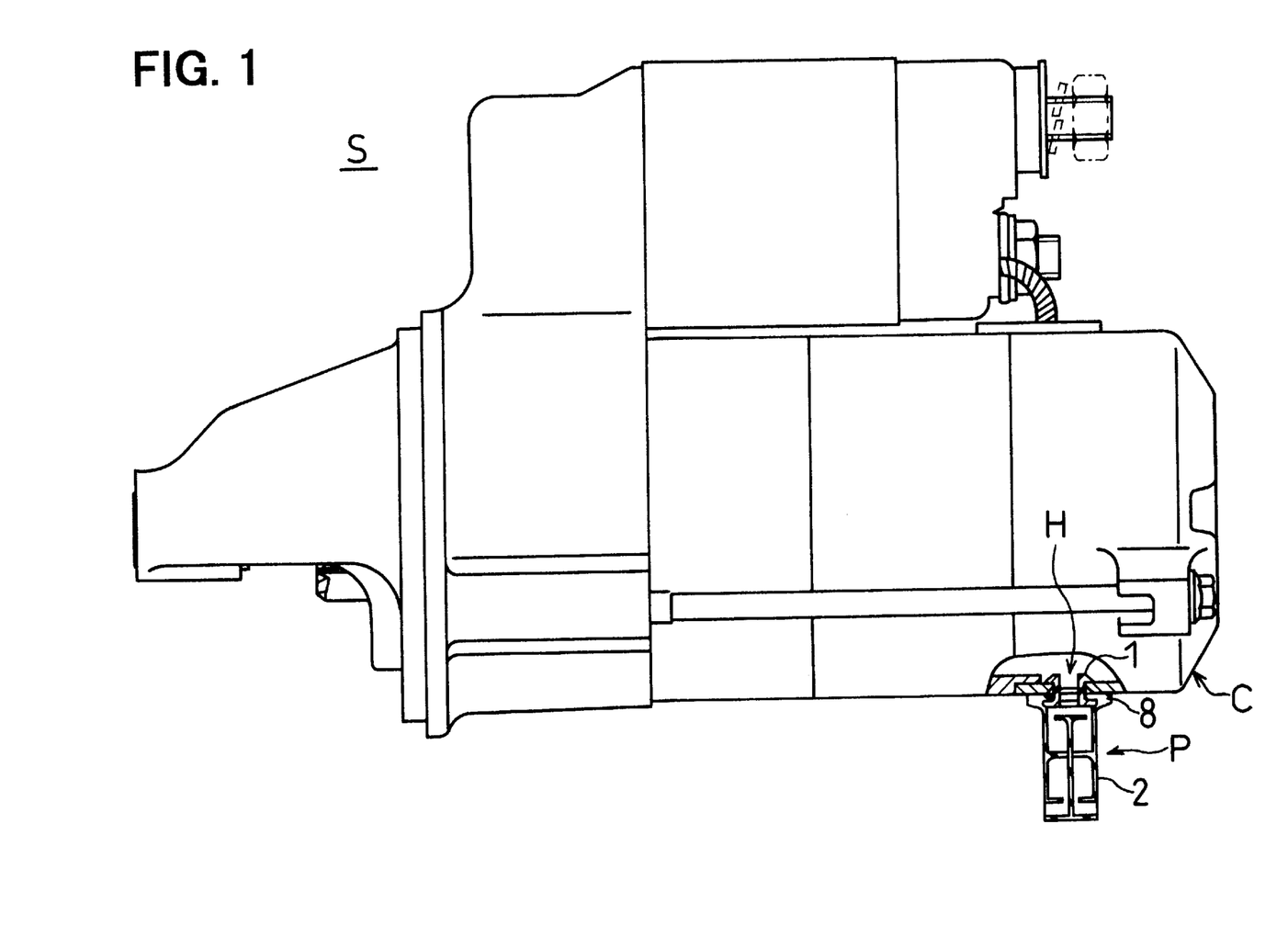
FIG. 1 is a partial cross-sectional view showing arrangement of a drain pipe according to a first embodiment of the present invention.

With reference to FIG. 1, a drain pipe P for draining water or the like according to a first embodiment of the present invention is connected to a drain hole H of a casing C that constitutes a motor rear end part of a starter S of a vehicle.

Figure 2:
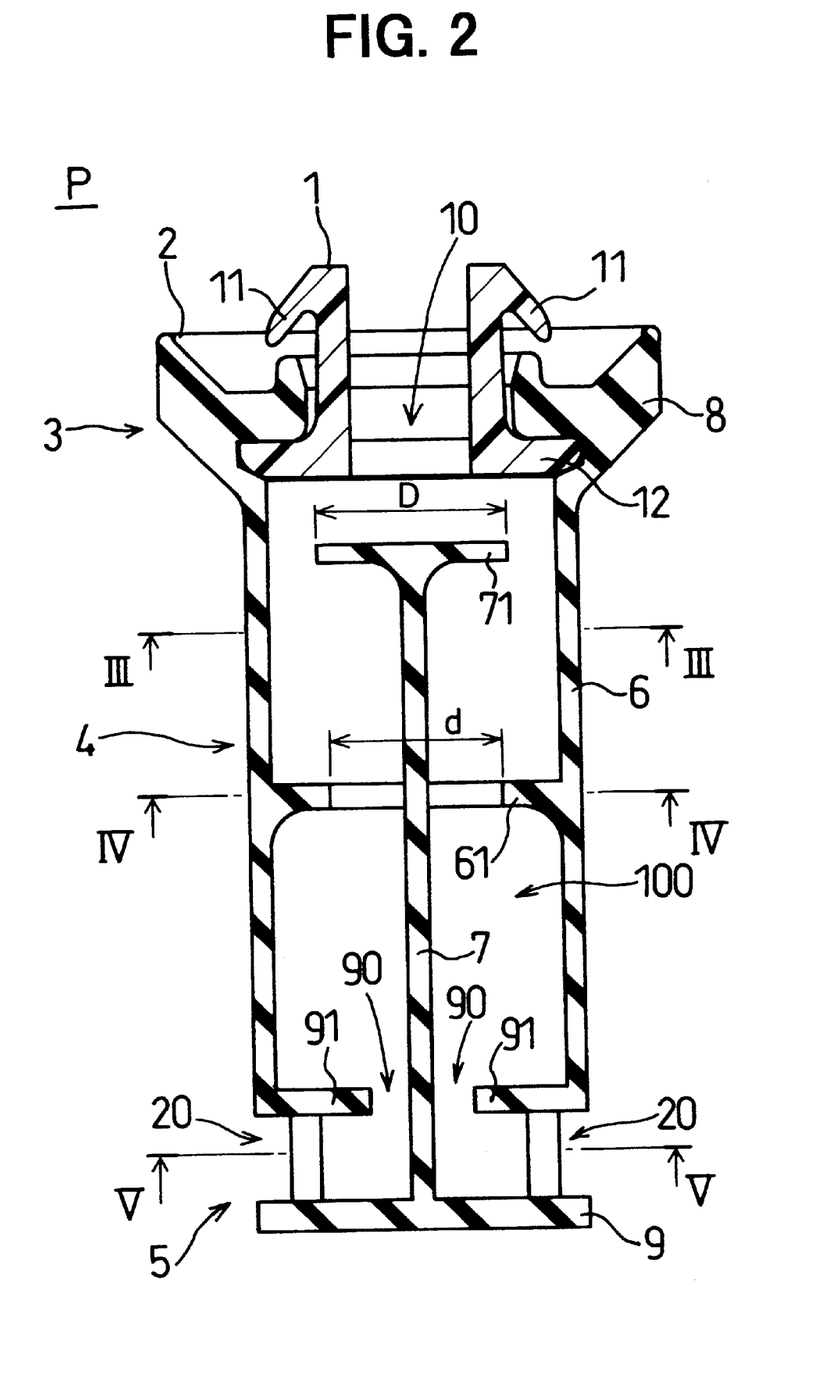
FIG. 2 is a longitudinal cross-sectional view of the drain pipe according to the first embodiment.

The drain pipe P includes a connecting member 1 made of a plastic material and a main body member 2 made of a rubber material. As shown in FIG. 2, the connecting member 1 includes a pair of claws 11 at its upper end and a flange 12 at its lower end. The claws 11 extend in opposite directions, respectively, and the flange 12 is formed as an annular disk. With reference to FIG. 1, the connecting member 1 sealingly connects an engaging portion 8 arranged at an upper end of the main body member 2 to an outer wall surface of the casing C.

With reference to FIG. 2, the drain pipe P of the present embodiment includes a water inlet opening 10 at its upper end part 3 and a couple of water outlet openings 20 at its lower end part 5. The water inlet opening 10 is communicated to an internal space of the casing C (FIG. 1). The water outlet openings 20 face away from each other and extend laterally outwardly of the drain pipe P. The drain pipe P further includes a cylindrical outer wall 6 at its intermediate part 4 and a partition wall 7 received within the cylindrical wall 6. The cylindrical outer wall 6 defines an interior space 100 therein. The interior space 100 communicates the water inlet opening 10 with the water outlet openings 20. The interior space 100 is partially divided into two compartments by the partition wall 7 that axially extends in the interior space 100 from an axial intermediate point of the interior space 100 to a base end of the drain pipe P. Each one of the water outlet openings 20 is provided for each corresponding one of the compartments of the interior space 100 and faces in a lateral direction that is opposite from that of the other water outlet opening 20.

Figure 3:
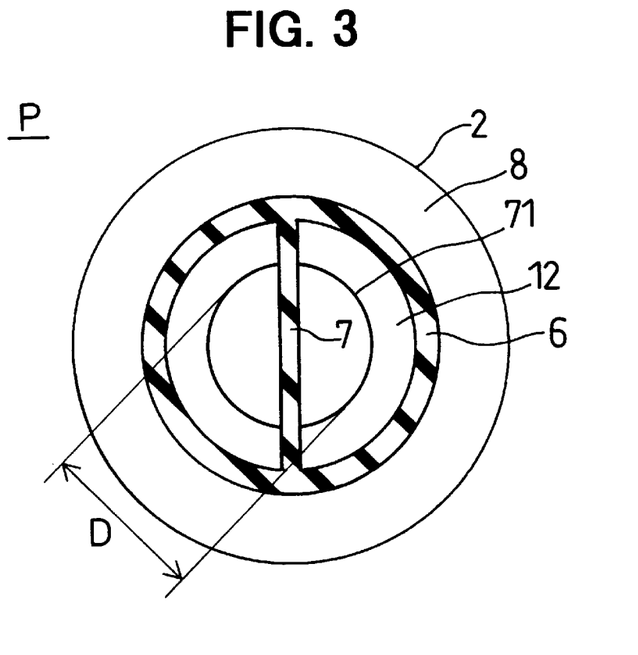
FIG. 3 is a cross-sectional view along line III—III in FIG. 2.

As shown in FIG. 2, the partition wall 7 has a baffle board 71 at its upper end. The baffle board 71 extends laterally outwardly on both sides of the partition wall 7 in an upper end part of the interior space 100. As shown in FIG. 3 which is a cross-sectional view along line III—III in FIG. 2, the baffle board 71 has a circular disk shape with an outer diameter D and is coaxial with the cylindrical outer wall 6.

Figure 4:
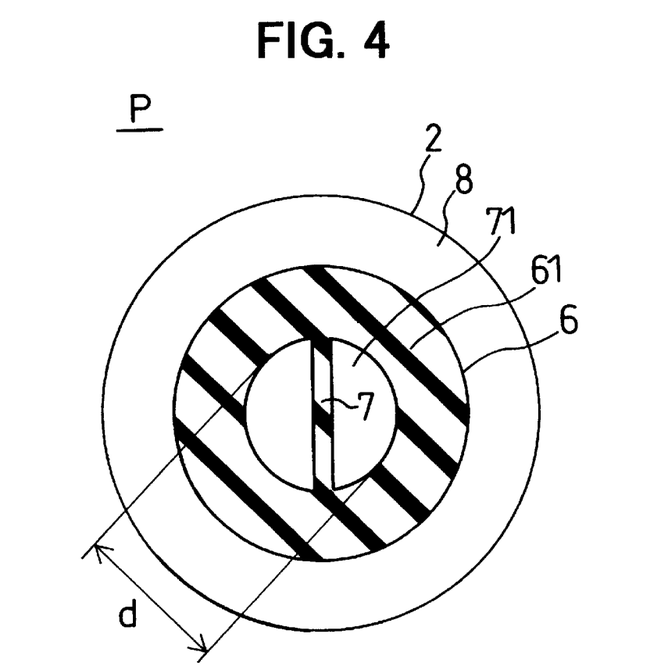
FIG. 4 is a cross-sectional view along line IV—IV in FIG. 2.

With reference to FIG. 4 which is a cross-sectional view along line IV—IV in FIG. 2, the outer wall 6 includes a ring-shaped neck portion 61 at the intermediate part 4 of the drain pipe P. The neck portion 61 extends toward a center of the interior space 100. An inner diameter d of an opening in the neck portion 61 is smaller than the outer diameter of the baffle board 71, as shown in FIG. 2. That is, a projected area (size or outer diameter D) of the baffle board 71 is large enough to entirely cover the opening (inner diameter d) of the neck portion 61.

As shown in FIG. 2, the water inlet opening 10 is sufficiently narrowed with respect to the outer diameter D of the baffle board 71 by an inner diameter of the flange 12 of the connecting member 1. The baffle board 71 having the outer diameter D larger than the inner diameter of the water inlet opening 10 is placed adjacent to the water inlet opening 10 below the flange 12.

Figure 5:
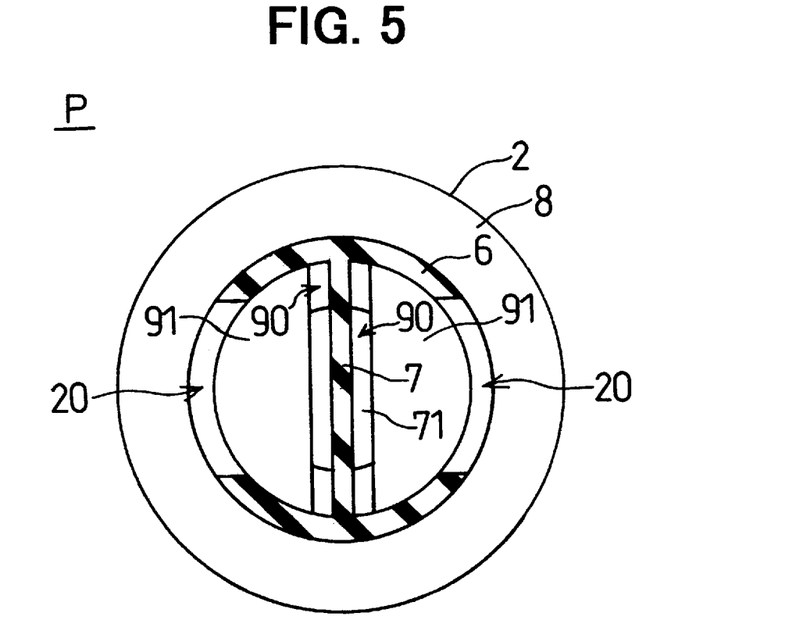
FIG. 5 is a cross-sectional view along line V—V in FIG. 2.

At a base of the outer wall 6, a pair of inner base projections 91 extend radially inwardly from the outer wall 6, and a base plate 9 is supported by a portion of the outer wall 6 and the partition wall 7. The water outlet openings 20 penetrate through opposed points of the portion of the outer wall 6 disposed axially between the base plate 9 and the inner base projections 91. As shown in FIG. 5 which is a cross-sectional view along line V—V in FIG. 2, the inner base projections 91 are opposed with each other and extend toward the partition wall 7. A couple of rectangular inner openings 90 are provided between inner edges of the inner base projections 91 and the partition wall 7.

With the above-described arrangement, a labyrinth is formed in the interior space 100 by the water inlet opening 10, the baffle board 71, the neck portion 61 and the inner base projections (acting as another neck portion) 91.

The first embodiment provides the following advantages.

All the water outlet openings 20 are opened on the lateral sides of the drain pipe P, and a lower side of the drain pipe P is covered with the base plate 9. Thus, the lower side of the drain pipe P does not have a substantial opening through which water can penetrate into the interior space 100, so that the intrusion of the water into the internal space of the casing C from the lower side of the drain pipe P is substantially restrained. Furthermore, the inner base projections 91 deeply extend into the respective water outlet openings 20, so that the water applied obliquely and upwardly to the drain pipe P is substantially restrained from entering into the internal space of the casing C.

In a case of the water applied to one lateral side of the drain pipe P, the water is substantially restrained from entering into the internal space of the casing C. That is, when the water is applied to the one lateral side of the drain pipe P and thereby to one water outlet opening 20, the other water outlet opening 20 does not receive the water due to the presence of the partition wall 7. Thus, even if a negative pressure is developed within the internal space of the casing C, the air can be drawn from the other outlet opening 20 through the interior space 100, and thereby the water is not drawn into the internal space of the casing C through the one water outlet opening 20 to which the water is applied.

Even if the water of relatively high pressure is applied to the lateral side of the drain pipe P, and thereby the water penetrates into the interior space 100 and is directed toward the water inlet 10 along the partition wall 7 from the water outlet opening 20, the water is laterally deflected by the baffle board 71. Thus, the intrusion of the water into the internal space of the casing C is substantially restrained. The labyrinth is defined in the interior space 100 by the baffle board 71 having the outer diameter D, the water inlet opening 10 having the inner diameter smaller than the outer diameter D of the baffle board 71, the neck portion 61 and the like. As a result, even if the water of the relatively high pressure is applied to the drain pipe P and splashes into the interior space 100 of the drain pipe P, the intrusion of the water into the internal space of the casing C is substantially restrained.

Therefore, the drain pipe P of the present embodiment can restrain both the intrusion of the water into the internal space of the casing C upon application of the water to the lower side of the drain pipe P and the intrusion of the water into the internal space of the casing C upon application of the water to the lateral side of the drain pipe P. Furthermore, even if the water of relatively high pressure is applied to the drain pipe P, the intrusion of the water into the internal space of the casing C can be advantageously restrained, as described above.

(First Modification of the First Embodiment)

Figure 6:
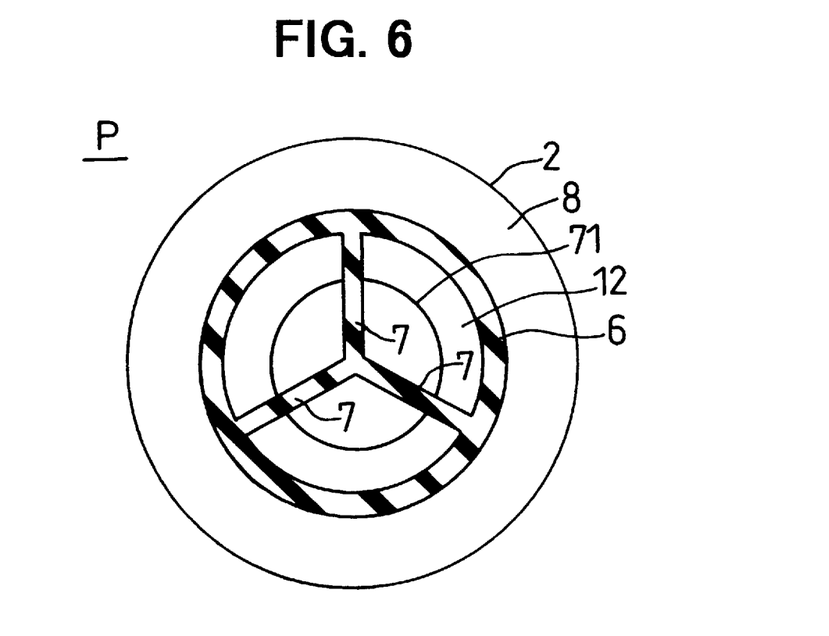
FIG. 6 is a cross-sectional view similar to FIG. 3, showing a first modification of the first embodiment.

A first modification of the first embodiment will be described with reference to FIG. 6 that is similar to FIG. 3 showing a cross-sectional view along line III—III in FIG. 2. In the first modification, the interior space 100 of the drain pipe P is divided into three compartments of substantially equal size by the partition wall 7. Furthermore, three water outlet openings 20 are arranged at 120 degree intervals and laterally open three different directions. Thus, even if the water is applied to and is retained in two of the three water outlet openings 20, the air can still pass through the remaining one water outlet opening 20. As a result, even if the negative pressure is developed within the internal space of the casing C, the water is not drawn into the internal space of the casing C. Therefore, according to the present embodiment, the advantages similar to those of the first embodiment are achieved, and the water applied from a plurality of lateral directions can be advantageously restrained from entering into the internal space of the casing C.

Furthermore, the partition wall 7 can be modified to have a crisscross shaped cross-section to divide the interior space 100 into four compartments, and four water outlet openings 20 can be provided to the four compartments, respectively. In this case, the water applied from the plurality of lateral directions can be advantageously restrained from penetrating into the internal space of the casing C.

(Second Modification of the First Embodiment)

Figure 7:
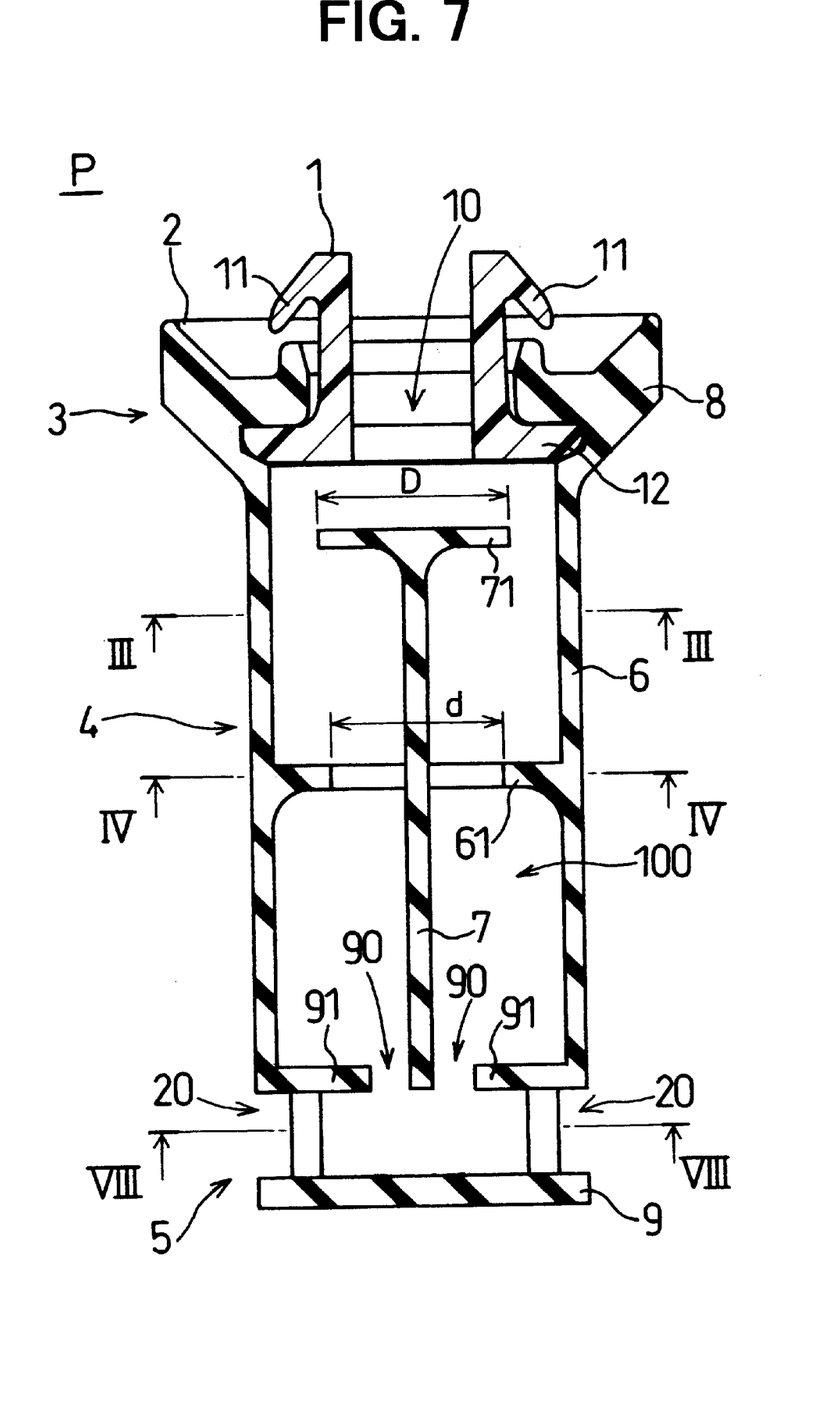
FIG. 7 is a longitudinal cross-sectional view showing a second modification of the first embodiment.
Figure 8:
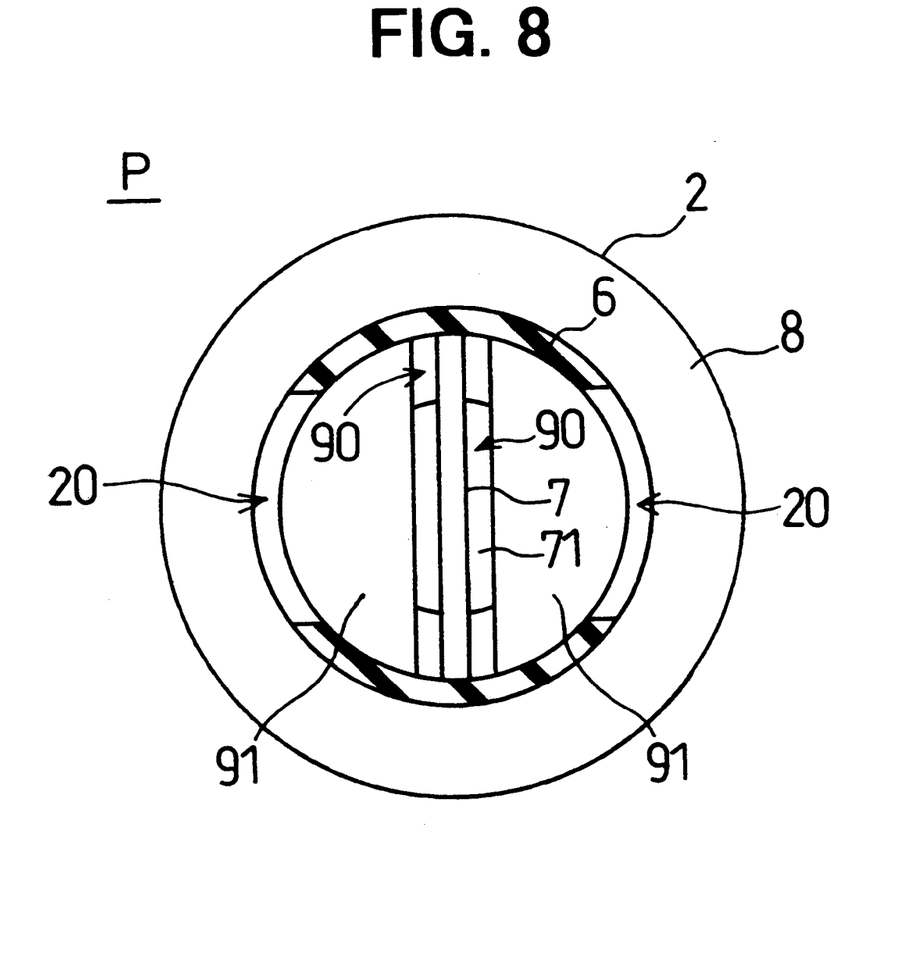
FIG. 8 is a cross-sectional view along line VIII—VIII in FIG. 7.

A second modification of the first embodiment will be described with reference to FIGS. 7 and 8 (a cross-sectional view along line VIII—VIII in FIG. 7). In the second modification, the partition wall 7 is not connected to the base plate 9, and the two water outlet openings 20 are directly communicated with each other. With this arrangement, when the water of relatively high pressure is laterally applied to one water outlet opening 20, the applied water directly exits from the other water outlet opening 20. Thus, in this drain pipe P, in addition to advantages similar to those of the first embodiment, the water of the relatively high pressure can be advantageously restrained from penetrating into the internal space of the casing C.

A modification similar to the first modification can be applied to the second modification. In such a case, advantages of the first modification can be additionally achieved.

(Second Embodiment)

Figure 9:
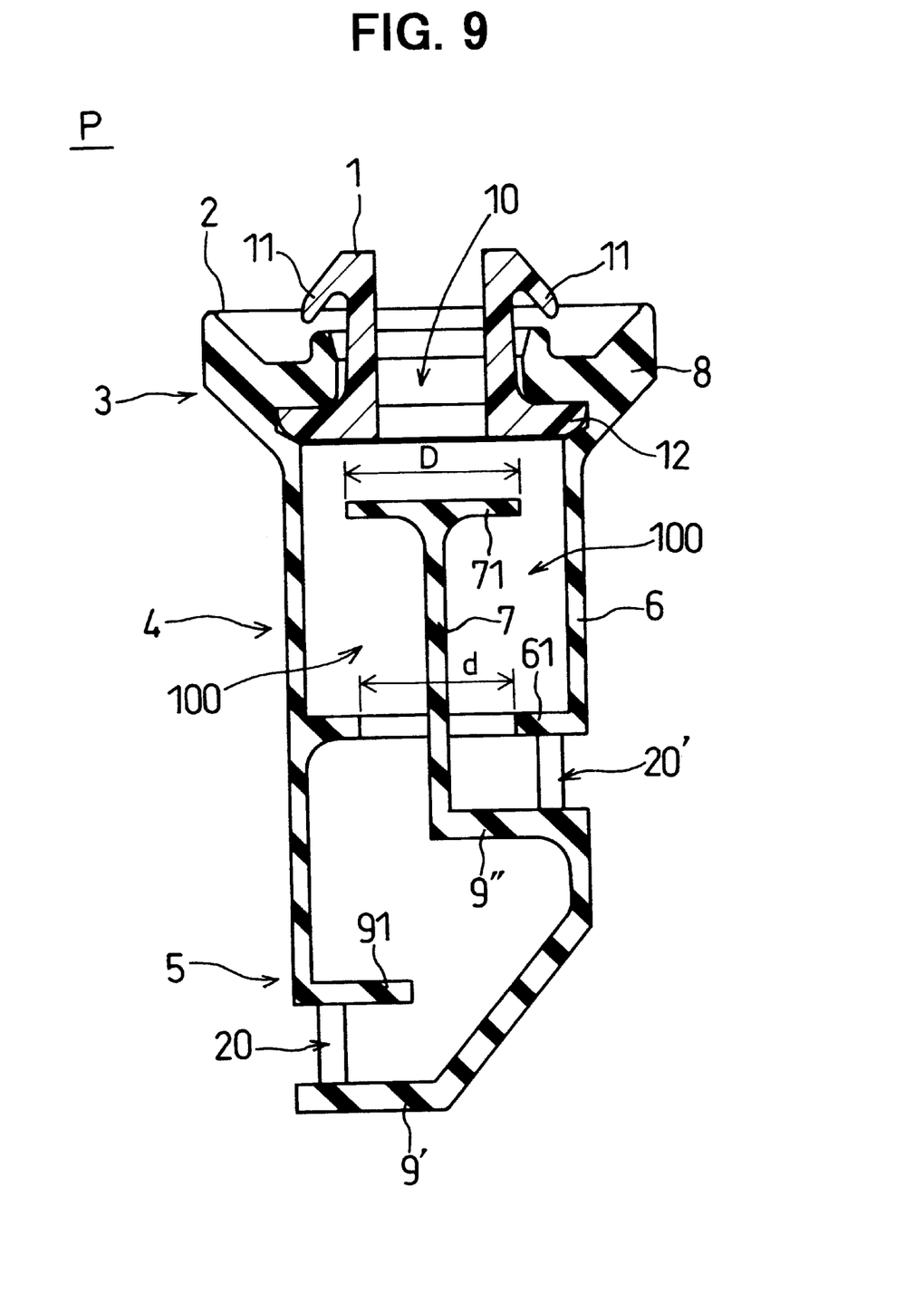
FIG. 9 is a longitudinal cross-sectional view showing a drain pipe according to a second embodiment.

A drain pipe according to a second embodiment of the present invention will be described with reference to FIG. 9. Two water outlet openings 20, 20' that face away from each other are arranged at different axial positions (different heights). The rest of the structure of the drain pipe P according to the second embodiment is substantially the same as that of the first embodiment.

The second embodiment provides the following advantages.

In the drain pipe P according to the second embodiment, a height difference is present between the two water outlet openings 20, 20'. Thus, even if a water level rises, and thereby the lower water outlet opening 20 is immersed in the water, the development of the negative pressure in the internal space of the casing C (FIG. 1) does not cause drawing of the water into the internal space of the casing C as long as the upper water outlet opening 20' is located above the water level. This is due to the fact that because of the height difference between the lower water outlet opening 20 and the upper water outlet opening 20', the air can be drawn into the internal space of the casing C through the upper water outlet opening 20' located above the water level, and thereby the water is not drawn from the lower water outlet opening 20' located under the water level.

As a result, in the drain pipe according the second embodiment, in addition to advantages similar to those of the first embodiment, the intrusion of the water into the internal space of the casing C is advantageously restrained even during the rise of the water level until all the water outlet openings 20, 20' are placed below the water level.

(A First Modification of the Second Embodiment)

Similar to the first modification of the first embodiment, in a first modification of the second embodiment, the interior space 100 is divided into three or four compartments by a partition wall 7, and the same number of the water outlet openings 20, 20' are laterally opened. At least one of the water outlet openings 20, 20' is placed at a different height from the rest of the openings 20, 20'. In this modification of the second embodiment, in addition to the advantages of the second embodiment, it is possible to achieve-advantages similar to those of the first modification of the first embodiment.

Additional advantages and modifications will readily occur to those skilled in the art. The invention in its broader terms is therefore, not limited to the specific details, representative apparatus, and illustrative examples shown and describe. Changes may be made in detail, especially in matters of shape, size and arrangement of parts within the principles of the invention to the full extent indicated by the broad general meaning of the terms in which the appended claims are expressed.

What is claimed is:

1. A drain pipe connected to a drain hole of a casing, said drain pipe comprising:

a water inlet opening arranged at an upper end part of said drain pipe, said water inlet opening being communicated to an internal space of said casing;

a plurality of water outlet openings arranged at a lower end part of said drain pipe, said plurality of water outlet openings extending laterally of said drain pipe in different directions;

a cylindrical outer wall arranged at an intermediate part of said drain pipe, said cylindrical outer wall defining an interior space therein, said interior space communicating said water inlet opening with said water outlet openings; and a partition wall provided within said interior space of said cylindrical outer wall to divide at least a portion of said interior space of said cylindrical outer wall into a plurality of compartments, each one of said plurality of water outlet openings being provided to each corresponding one of said plurality of compartments.

2. A drain pipe according to claim 1, wherein said partition wall has a baffle board laterally extending within said interior space of said cylindrical outer wall.

3. A drain pipe according to claim 2, wherein:

said cylindrical outer wall includes at least one neck portion that has an opening axially penetrating therethrough, said at least one neck portion radially inwardly protruding from said cylindrical outer wall; and said baffle board has a size that substantially entirely covers said opening of said at least one neck portion.

4. A drain pipe according to claim 1, wherein said plurality of water outlet openings directly communicate with each other.

5. A drain pipe according to claim 1, wherein said plurality of water outlet openings are arranged at different positions along an axial direction of said drain pipe.

6. A drain pipe according to claim 3, wherein said size of said baffle board is larger than that of said water inlet opening.

7. A drain pipe according to claim 1, wherein said water outlet openings are separated from each other by said partition wall.

* * * * *